United States Patent Office 3,600,470
Patented Aug. 17, 1971

3,600,470
HYDROXY OR ALKOXY PHOSPHONATE COMPOSITIONS AND AMINE SALTS THEREOF
Morton Lewis, Elmhurst, Ill., assignor to
Swift & Company, Chicago, Ill.
No Drawing. Filed Oct. 27, 1967, Ser. No. 678,546
Int. Cl. C07f 9/40; C09k 3/00; C08f 5/58
U.S. Cl. 260—924
13 Claims

ABSTRACT OF THE DISCLOSURE

Hydroxy substituted phosphonates are produced by reacting a halohydrin with an aliphatic or aromatic phosphite. At high temperatures, an acidic compound is formed instead of, or at least substantially in place of the neutral compound. The neutral ester of the phosphonic acid can be subjected to either acidic or basic hydrolysis to form the free phosphonic acid, which in turn can react with alkyl amines or alkylol amines to form excellent corrosion inhibitors. The neutral esters themselves can be used as additives for extreme pressure lubricants.

---

This invention relates, broadly, to organic phosphorus compounds and is particularly concerned with organic phosphorus compounds which contain an oxygen-multiple carbon-phosphorus-oxygen linkage and with processes for producing them.

In the study of phosphorus chemistry, the methods of synthesis are conveniently arranged according to the type of grouping or moiety that is desired at the phosphorus atom. For example, the various methods of synthesis may be classified as phosphorus-halogen bond, phosphorus-hydrogen bond, phosphorus nitrogen bond, phosphorus-hydroxyl bond, phosphorus-ester bond (alkoxy-P and thio-P esters) and phosphorus-carbon bond.

Synthesis of phosphorus-carbon bond compounds, in turn, can be subdivided. While the direct attachment of a carbon-bearing group to the phosphorus atom can be achieved by several methods, it is not uncommon, when producing carbon-phosphorus-oxygen compounds, to use the Michaelis-Arbuzov reaction. That is, compounds having an OR group bound to trivalent phosphorus react with active organic halides with loss of the alkyl halide, RX (whose R is that of the OR group), yielding the corresponding esters of phosphonic or phosphinic acid. These phosphonate esters are chemically neutral species and, when the alkyl group of the original alkyl halide is a large carbon chain, they are usually viscous oils. As a by-product of the reaction, one of the alkyl groups, when trialkyl phosphite is used, combines with the halogen of the original alkyl halide to split off a new alkyl halide which is normally more volatile and, hence, is distilled from the reaction mixture.

It is an object of this invention to prepare new compositions of matter.

Another object of the invention is to provide novel alkyl esters of phosphonates possessing phosphorus-multiple carbon-oxygen linkage.

Additional objects, if not specifically set forth herein, will be readily apparent to those skilled in the art from a reading of the detailed description of the invention which follows.

The new compounds of this invention are of the general formula:

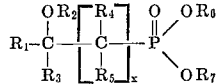

wherein $R_1$, $R_3$, $R_4$ and $R_5$ are the same or different in any compound and can be hydrogen, a $C_1$–$C_{30}$ alkyl, alkenyl alkynyl straight or branched chain radical, carboalkoxyalkylene, alkyl aryl, arylalkyl, aryloxy or alkoxy, alkoxyalkylene, aryloxyalkylene, alkoxyphenylene, or aryloxyphenylene of up to 30 carbons, or aryl of less than 18 carbons; $R_6$ and $R_7$ can be the same or different and are hydrogen, alkyl, alkenyl, alkynyl, or aryl groups of 1 to 30 carbons; $x$ is an integer of 1 to 3 with the provision that all the $R_4$'s and $R_5$'s need not be the same.

A specific subclass of compounds may be defined as having the above formula with the provision that $R_1$ is alkyl, alkoxy, or alkoxyalkylene of 1 to 30 carbons, and $R_2$, $R_3$, $R_4$, $R_5$, $R_6$, and $R_7$ are hydrogen or alkyl radicals usually of less than 8 carbons each and $R_2$, $R_3$, $R_4$, $R_5$, $R_6$, and $R_7$ can be the same or different. Of particular importance is the class of compounds wherein $R_2$ is an alkyl group of 1 to 4 carbons and $R_6$ or $R_7$ is hydrogen. Such compounds are believed to be formed by thermal rearrangement and details thereof will be set forth hereinafter.

In preparing the compounds of the present invention by reacting an hydroxy-halide with the particular trialkyl or triaryl phosphite, the reaction temperature is carefully regulated depending upon the product desired. At high temperatures, usually substantially above about 180° C., an acidic compound is formed instead of, or at least substantially in place of the neutral compound. The acidic compound will form water-soluble salts with basic materials such as the alkyl amines or alkylol amines and inorganic bases. Diethylamine, triethylamine, dipropylamine, diethanolamine, diisopropanolamine, sodium hydroxide, potassium hydroxide, etc., react readily with the acid half-ester to form water-soluble salts which are highly surface active and are also good foamers. Alkaline earth and transition metal salts of the phosphonic acids of the invention can be used as vinyl stabilizers. The salts of triethylamine and triethanolamine are good corrosion inhibitors when coated on the tin plate or strip steel of the non-stainless variety or when contained in the solutions into which these metals are to be immersed. Test coupons have been free of corrosion for over a year when immersed in water containing these salts at very low concentrations.

The reaction, using an alkoxyalkylene chlorohydrin as a representative member of the class, may be illustrated generally by the following equation:

$$R-O-CH_2CHOHCH_2Cl + (CH_3CH_2O)_3P \longrightarrow$$
$$\text{I} \qquad\qquad \text{II}$$

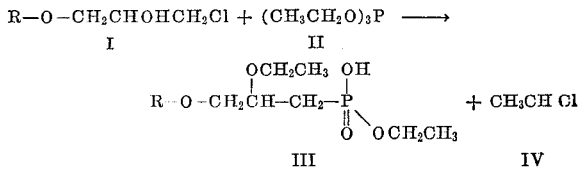

The 1-alkoxy, 2-hydroxy, 3-chloropropane (I) is reacted with the phosphite (II) at temperatures above about 180° C. and preferably above about 230° C. to give the acidic product which is represented as (III) and the alkyl halide (IV) which is distilled from the reaction mixture as a by-product.

In the reaction, the phosphorus shifts from the trivalent to the pentavalent state; the additional two valence bonds being occupied by an oxo-oxygen atom. It should also be noted that during the high temperature reaction, thermal rearrangement takes place resulting in an acidic function attached to the phosphorus atom and etherification of the free hydroxyl function present on the original halo-hydroxy reactant.

In those instances where it is desirable to produce the non-acidic compound, i.e., the neutral ester, the reaction temperature is held at 200° C. or below and preferably below 180° C. The neutral compound, starting with the above mentioned reactants can be represented as

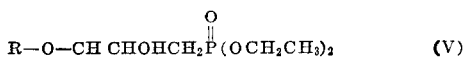

$$R-O-CH\ CHOHCH_2\overset{O}{\overset{\|}{P}}(OCH_2CH_3)_2 \qquad (V)$$

Heating of the neutral compound (V) to temperatures substantially above about 180° C. brings about the rearrangement to the acidic product (III). When forming the neutral product in this manner, the phosphorus again shifts from the trivalent to the pentavalent state; the additional two valence bonds being occupied by an oxo-oxygen atom. However, it should be noted that the free hydroxyl group in the original halo-hydroxy reactant remains intact and is capable of undergoing the typical hydroxy reactions. For example, the hydroxy group may be reacted with 2 to 100 moles of ethylene oxide to produce an ethoxylated phosphonate exhibiting surface active properties.

The neutral ester of the phosphonic acid can be subjected to either acidic or basic hydrolysis to form the free phosphonic acid, which in turn can react with alkyl amines or alkylolamines to form excellent corrosion inhibitors. The neutral esters can be used as additives for extreme pressure lubricants.

More in detail as to the specific reactants, it has been found that halo-hydroxy compounds having the halogen and hydroxy substituents on either adjacent carbons or separated by up to 3 carbon atoms are capable of forming the acidic phosphonates by means of the subsequent thermal rearrangement. While in some instances it is preferred to use terminal halides, nonterminal halides function satisfactory and are quite desirable in certain situations.

A specific class of most desirable compounds can be produced by reacting an ether halohydrin, especially chlorohydrin, but bromo- or iodo-hydrins react as well, with the particular trialkylphosphite. The ether halohydrins can be represented by the formula:

$$R-O-[CH_2]_yCHOH[CH_2]_zX$$

wherein X is a middle halogen selected from the group consisting of chlorine, bromine and iodine, y is an integer of 1–10, z is an integer of 1–4, and R is an alkyl, alkenyl, alkynyl straight or branched chain radical of 1 to 30 carbons, preferably 6 to 20 carbons. Examples of compounds wherein y and z are 1 include 1-methoxy, 2-hydroxy, 3-chloropropane; 1-ethoxy, 2-hydroxy, 3-bromopropane; 1-propoxy, 2-hydroxy, 3-chloropropane; 1-butoxy, 2-hydroxy, 3-iodopropane; 1-heptoxy, 2-hydroxy, 3-bromopropane; 1-octoxy, 2-hydroxy, 3-bromopropane; 1-decoxy, 2-hydroxy, 3-bromopropane; 1-eicosoxy, 2-hydroxy, 3-chloropropane; 1-tetracosoxy, 2-hydroxy, 3-chloropropane; 1-triacontoxy, 2-hydroxy, 3-chloropropane.

When using substituted butanes the alkoxy group can be at the 1-position, the hydroxy group on either the 2-position, 3-position or 4-position and the halogen at either the 2-position, 3-position or 4-position, with the provision that the halo function and the hydroxyl function cannot occupy the same position (attached to the same carbon atom) at the same time. Examples include 1-ethoxy, 3-hydroxy, 4-chlorobutane; 1-butoxy, 2-hydroxy, 3-iodobutane; 1-hexoxy, 3-hydroxy, 4-bromobutane; 1-decoxy, 2-hydroxy, 3-chlorobutane; 1-tetradecoxy, 3-hydroxy, 4-chlorobutane; and 1-octadecoxy, 3-hydroxy, 4-chlorobutane.

In forming the specific class of acid phosphonates, care must be exercised in selecting the appropriate phosphite inasmuch as one of the organic radicals of the phosphite will end up etherifying the free hydroxyl of the original halohydroxy compound. In addition, it is normally desirable to use a phosphite having an alkyl radical that will combine with the halide and form an alkyl halide which is capable of being readily volatilized. This is not a limitation on the invention, however, since even if the alkyl halide that is split out is of such a molecular weight that the distillation is not readily performed, separation by other means such as vacuum distillation may be performed.

Highly desirable phosphite reactants that can be used may be represented by the formula:

$$(RO)_3P$$

wherein R is a straight or branched chain alkyl, alkenyl, alkynyl, haloalkyl or aryl radical of 1–20 carbons, preferably 1 to 8 carbon atoms. Examples include trimethyl phosphite, triethylphosphite, tripropyl phosphite, triisopropyl phosphite, tributyl phosphite, triisobutyl phosphite, triamyl phosphite, trihexyl phosphite, tri(2-ethyl hexyl) phosphite, triheptyl phosphite, and trioctyl phosphite, etc. Mixed phosphites such as ethyldimethylphosphite, methyldiethylphosphite, ethyldibutylphosphite, propyldidocenylphosphite, dibutyloctadecenylphosphite, etc. may be used. Also included are the halogenated phosphites such as tri-(beta-chloroethyl) phosphite, ethyl di-(beta-chloroethyl) phosphite, dipropyl (beta-chloroethyl) phosphite. Also of importance are the unsaturated phosphites, such as triallyl phosphite inasmuch as these compounds provide multiple reactive sites for subsequent halogenation or polymerization. Other unsaturated phosphites include tricinnamyl phosphite, trimethallyl phosphite, trivinyl phosphite, tri-2-butenyl phosphite, tri-isopropenyl phosphite and tri-2-cyclohexylallyl phosphite.

The following examples are set forth as illustrated embodiments of the invention and are not to be taken in any manner as limiting the invention.

EXAMPLE I

Into a 250 ml. 3-neck round bottom flask equipped with a gas inlet, a reflux condenser with a gas outlet at the top, and a thermometer were weighed 69.5 grams of 1-dodecoxy, 2-hydroxy, 3-chloropropane (0.25 mole) and 83 grams of triethyl phosphite (0.5 mole). A very slow but steady stream of air (or nitrogen) was maintained over the reaction mixture in order to remove the ethylchloride as it was formed. Heating was effected by means of a Glas-Col heating mantle. The temperature was increased until at about 110° C. the reaction began and ethylchloride started to boil out of the reaction mixture. Heat was continually applied over a period of five hours as the temperature slowly arose to 255° C. At this point, discoloration and decomposition began and the reaction was stopped. An acid titration was run to give an apparent molecular weight of the product. The titration gave an apparent molecular weight of 489 (theory is 380). Distillation of a small sample to purify the product gave a water-white distillate with a molecular weight titration of 378.

EXAMPLE II

A reaction was run identical to that described in Example I except that the temperature was not allowed to exceed 220° C. When the temperature of the reaction mixture approached 220° C., the reaction was stopped and allowed to cool. Removal of as much excess triethyl phosphite as possible by evaporation under reduced pressure gave a neutral product. This neutral product was then reheated to 250° C. and allowed to recool. The product of this reheating to a temperature in excess of 220° C. gave an acidic product which behaved the same way as the product of Example I.

EXAMPLE III

Into a 300 ml. resin kettle equipped with a gas inlet, a reflux condenser with a gas outlet at the top, and a thermometer containing a temperature regulator were weighed 69.5 g. (0.25 mole) 1-dodecoxy, 2-hydroxy, 3-chloropropane and 62.0 g. (0.5 mole) trimethylphosphite. A very slow, steady stream of nitrogen, which was maintained throughout the reaction, was begun and heating by means of a Glas-Col heating mantle was started. Heat was continually applied, and over a period of 4 hours the temperature rose to 245° C. where it was maintained for an additional ¾ hour. The product was then cooled to room temperature and a small sample of the product was suspended in water and was very acidic, registering a ph of 1 or below when tested with pH paper. The crude product gave a molecular weight of 870 based on acid titration, however, a small sample after purification by distillation gave a molecular weight of 355 (theor. 352).

EXAMPLE IV

A reaction was run identical to that described in Example III above except that the temperature was controlled so that it could not exceed 210° C. Heating was continued for the same length of time as in the above example. The product was then cooled and as much excess trimethylphosphite as possible was removed by evaporation under reduced pressure. The resulting product was a neutral oil which on reheating to about 245° C. gave an acidic product that behaved the same as the product in Example III.

EXAMPLE V

Into a properly equipped 300 ml. resin kettle were weighed 44.6 g. (0.25 mole) 1-hexoxy, 2-hydroxy, 3-chloropropane and 62 g. (0.5 mole) trimethylphosphite. The reaction was run as previously described and when the temperature reached 240° C., it was maintained at this point for about ¾ hr. A sample of the cooled product was mixed with water and was very acidic showing a pH of 1 or below on pH paper. An acidic titration of the crude product gave an apparent molecular weight of 444. A small sample of the product was purified by distillation and gave a molecular weight of 271 (theor. 268).

EXAMPLE VI

The same reaction as in Example V was run with the same proportion of reactants and for the same length of time except that the temperature was controlled so as to not exceed 185° C. After workup the product was a neutral oil which could be made acidic by reheating to temperatures in excess of about 220° C.

EXAMPLE VII

Into a properly equipped 300 ml. resin kettle were weighed 45.3 g. (0.125 mole) 1-octadecoxy, 2-hydroxy, 3-chloropropane and 31.0 (0.25 mole) trimethylphosphite. The reaction was run in the usual manner. The reaction product was strongly acidic when suspended in water and tested with pH paper.

EXAMPLE VIII

The same reaction as Example VII was run again except that the temperature was controlled so that it did not exceed 180° C. The product after work-up was neutral to pH paper when a sample was suspended in water.

EXAMPLE IX

Into a properly equipped 300 ml. resin kettle were weighed 70 g. (0.2 mole) methyl, 9(10)-chloro, 10(9)-hydroxystearate (made from the addition of hydrogen chloride to methyl, 9,10-epoxystearate) and 49.6 g. (0.4 mole) trimethylphosphite. The reaction was run in the usual way, slowly heating the mixture to 245° C. and holding it at that range for about ¾ hour. A sample of the cooled reaction product was dispersed in water and it showed a pH of 1 or less when tested with pH paper. An acidic titration of the crude reaction product gave an apparent molecular weight of 411 (theor. 422). The product was not purified.

EXAMPLE X

The reaction of Example IX was run again except that the temperature was not allowed to exceed 185° C. After the same reaction period the product was cooled and the sample taken and dispersed in water. It was neutral to pH paper.

EXAMPLE XI

Into a properly equipped 300 ml. reaction kettle was weighed 31.5 g. (0.33 mole) 3-chloropropanol and 82.7 g. (0.67 mole) trimethylphosphite. The reaction was run in the usual manner heating the mixture to 248° C. and maintaining it for about one hour. The resulting product was water soluble and highly acidic. It registered a pH of one or below when tested with pH paper.

EXAMPLE XII

The reaction of Example XI was repeated except that the temperature was controlled so that it did not exceed 185° C. After the same reaction period the product was also found to be water soluble. It was, however, neutral to pH paper.

EXAMPLE XIII

Into a properly equipped reaction vessel was weighed 46.3 (0.33 mole), 3-bromopropanol and 82.7 g. (0.67 mole) trimethylphosphite. The temperature was slowly raised to about 245° C. and maintained there for about one hour. The reaction product was water soluble and very acidic.

EXAMPLE XIV

The same reaction as Example XIII was repeated with the temperature controlled so that it could not rise above 185° C. The resulting product was water soluble but neutral to pH paper.

EXAMPLE XV

Into a properly equipped resin kettle was weighed 36.2 g. (0.33 mole) 4-chloro-1-butanol and 82.7 g. (0.67 mole) trimethylphosphite. The reaction was run in the usual manner allowing the temperature to slowly rise to about 245° C. and maintaining it there for about ¾ hr. The resulting product was water soluble and highly acidic. It had a pH of 1 or less using pH paper.

EXAMPLE XVI

The same reaction of Example XV was run except that the temperature was controlled so that it would not exceed 185° C. After the same reaction period, the product was found to be water soluble but neutral to pH paper.

Obviously, many modifications and variations of the invention as hereinbefore set forth may be made without departing from the spirit and scope thereof, and therefore only such limitations should be imposed as are indicated in the appended claims.

I claim:
1. A phosphonate having the formula:

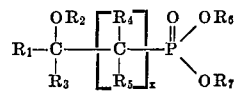

wherein $R_1$ is an alkoxyalkylene group of 2–30 carbon atoms; $R_3$, $R_4$ and $R_5$ are hydrogen or alkyl groups of 1–8 carbon atoms; $R_2$, $R_6$ and $R_7$ are hydrogen or alkyl, alkenyl, or haloalkyl groups of 1–20 carbon atoms; X is an integer of 1–3; and when $R_2$ is hydrogen; $R_6$ and $R_7$ are other than hydrogen, and when $R_6$ is hydrogen, $R_2$ and $R_7$ are other than hydrogen.

2. The compound of claim 1 wherein $R_6$ is hydrogen, and $R_2$ and $R_7$ are alkyl, alkenyl, or haloalkyl groups of 1–20 carbon atoms.

3. The compound of claim 1 wherein $R_2$ is hydrogen, and $R_6$ and $R_7$ are alkyl radicals of 1–8 carbon atoms.

4. The compound of claim 2 wherein $R_2$ and $R_7$ are alkyl radicals of 1–8 carbon atoms.

5. The compound of claim 1 wherein $R_2$, $R_3$, $R_4$ and $R_5$ are hydrogen, and $R_6$ and $R_7$ are selected from the group consisting of methyl, ethyl, propyl and butyl radicals.

6. The compound of claim 2 wherein $R_2$ and $R_7$ are selected from the group consisting of methyl, ethyl, propyl, and butyl radicals.

7. A salt of the compound of claim 2 wherein the salt is selected from the group consisting of alkali metal salts, alkaline earth metal salts, diethylamine salts, diethanolamine salts, triethylamine salts, triethanolamine salts, dipropylamine salts, and diisopropanolamine salts.

8. A method for producing the compound of claim 1 when $R_6$ is hydrogen, which method comprises heating and reacting at temperatures greater than at least 180° C. (1) a phosphite having the formula $(RO)_3P$ wherein R is the same alkyl, alkenyl or haloalkyl radical of 1–20 carbon atoms as $R_2$ and $R_7$, and (2) an alkoxyalkylene halohydrin having the hydroxyl group separated from the halogen by not more than 3 carbon atoms and wherein the alkoxyalkylene group is $R_1$ and contains 2–30 carbon atoms.

9. The method of claim 8 wherein the reaction temperature is greater than 230° C.

10. The method of claim 9 wherein the phosphite is a trialkyl phosphite having 1–4 carbon atoms per alkyl radical.

11. The method of claim 10 wherein the halohydrin is a 1-alkoxy, 2-hydroxy, 3-halopropane.

12. A method for converting the compound of claim 1 when $R_2$ is hydrogen to the compound of claim 1 when $R_6$ is hydrogen, which method comprises heating the former compound to a temperature greater than at least 180° C., thereby etherifying the original hydroxyl function.

13. The method of claim 12 wherein the temperature is greater than 230° C.

References Cited

UNITED STATES PATENTS

| | | | |
|---|---|---|---|
| 2,535,172 | 12/1950 | Tawney | 260—950 |
| 2,664,438 | 12/1953 | Ladd et al. | 260—950 |

CHARLES B. PARKER, Primary Examiner

A. H. SUTTO, Assistant Examiner

U.S. Cl. X.R.

252—32.5, 389; 260—47, 47.5, 429, 950, 953, 969, 983